(12) United States Patent
Im et al.

(10) Patent No.: US 9,395,477 B2
(45) Date of Patent: Jul. 19, 2016

(54) DISPLAY APPARATUS

(71) Applicant: Samsung Display Co., Ltd., Yongin, Gyeonggi-Do (KR)

(72) Inventors: Dong-Sung Im, Asan-si (KR); Hyun-Su Park, Hwaseong-si (KR); Gyu-Su Lee, Asan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 104 days.

(21) Appl. No.: 14/326,586

(22) Filed: Jul. 9, 2014

(65) Prior Publication Data

US 2015/0245506 A1    Aug. 27, 2015

(30) Foreign Application Priority Data

Feb. 27, 2014  (KR) .......................... 10-2014-0023011

(51) Int. Cl.
*G02B 5/30* (2006.01)
*G02F 1/1335* (2006.01)
*F21V 8/00* (2006.01)
*G02F 1/1333* (2006.01)

(52) U.S. Cl.
CPC ........ *G02B 5/3033* (2013.01); *G02F 1/133512* (2013.01); *G02B 6/0078* (2013.01); *G02B 6/0081* (2013.01); *G02F 2001/133317* (2013.01); *G02F 2201/50* (2013.01)

(58) Field of Classification Search
CPC .. G02B 6/0073; G02B 6/0091; G02B 6/0081; G02B 6/0083; G02B 5/3033; G02B 6/0078; H05K 5/0217; H05K 7/1427; H05K 1/028; H05K 5/0017; G02F 1/133512; G02F 2001/133317; G02F 2201/50
See application file for complete search history.

(56) References Cited

U.S. PATENT DOCUMENTS

| | | | |
|---|---|---|---|
| 5,870,160 A | 2/1999 | Yanagawa et al. | |
| 7,542,105 B2 | 6/2009 | Sato et al. | |
| 9,144,162 B2 * | 9/2015 | Kondoh | G02F 1/133308 |
| 2009/0256796 A1 * | 10/2009 | Jang | G02F 1/133308 345/102 |
| 2013/0128606 A1 * | 5/2013 | Baek | G02B 6/0068 362/602 |
| 2013/0182198 A1 | 7/2013 | Chang et al. | |
| 2014/0160694 A1 * | 6/2014 | Yoon | G02F 1/1303 361/749 |

FOREIGN PATENT DOCUMENTS

| | | | |
|---|---|---|---|
| JP | 06-027442 A | 2/1994 | |
| JP | 11-281968 A | 10/1999 | |
| JP | 2008-096851 A | 4/2008 | |
| JP | 2013-171619 A | 9/2013 | |
| JP | 2013-175301 A | 9/2013 | |
| KR | 1020080042685 A | 5/2008 | |

* cited by examiner

*Primary Examiner* — Bao Q Truong
(74) *Attorney, Agent, or Firm* — Cantor Colburn LLP (57) ABSTRACT

A display apparatus includes a display panel configured to display an image, a receiving container configured to receive the display panel, a buffering member disposed between the display panel and the receiving container, the buffering member including a first buffering portion which contacts the receiving container, and a second buffering portion which contacts the display panel and includes a first portion and a second portion which are independently compressible.

21 Claims, 6 Drawing Sheets

DISPLAY APPARATUS

This application claims priority to Korean Patent Application No. 10-2014-0023011, filed on Feb. 27, 2014, and all the benefits accruing therefrom under 35 U.S.C. §119, the contents of which are herein incorporated by reference in their entireties.

BACKGROUND

1. Field

The invention relates to a display apparatus. More particularly, the invention relates to a display apparatus capable of effectively preventing light-leakage.

2. Description of the Related Art

Recently, a liquid display apparatus having light weight and small size has been manufactured. A cathode ray tube ("CRT") display apparatus has been used due to a performance and a competitive price. However, the CRT display apparatus has a weakness with a size or portability. Therefore the liquid display apparatus has been highly regarded due to small size, light weight and low-power-consumption of the liquid display apparatus.

Generally, a liquid crystal display apparatus has a display panel and a receiving container receiving the display panel. The receiving container may include a top chassis and a bottom chassis. A buffering member may be disposed between the display panel and the top chassis. The buffering member may block light from a gap between the top chassis and the bottom chassis and remove static electricity charged on a polarizing film disposed on the display panel. In addition, the buffering member may effectively prevent a surface of the display panel from being scratched by the top chassis formed with metal.

SUMMARY

A buffering member may not block light from a gap between a top chassis and a bottom chassis completely. In addition, components on a display apparatus may be expanded due to heat so that a gap between the top chassis and the bottom chassis may be increased. Thus, light-leakage may be occurred.

Exemplary embodiments of the invention provide a display apparatus capable of effectively preventing light-leakage.

In an exemplary embodiment of a display apparatus according to the invention, the display apparatus includes a display panel configured to display an image, a receiving container configured to receive the display panel, a buffering member which is disposed between the display panel and the receiving container. The buffering member includes a first buffering portion contacting the receiving container and a second buffering portion contacting the display panel. The second buffering portion includes a first portion and a second portion independently compressible.

In an exemplary embodiment, the display panel may include a first substrate, a second substrate facing the first substrate and a polarizing film disposed on the second substrate. The second substrate may be smaller than the first substrate in a plan view. The polarizing film may be smaller than the second substrate in the plan view.

In an exemplary embodiment, the first portion of the second buffering portion may contact the first substrate. The second portion of the second buffering portion may contact the polarizing film.

In an exemplary embodiment, the second buffering portion may further include a third portion.

In an exemplary embodiment, the first portion may contact the first substrate. The second portion may contact the second substrate. The third portion may contact the polarizing film.

In an exemplary embodiment, the first buffering portion may have an "L" shape in a cross-sectional view.

In an exemplary embodiment, the first buffering portion may include at least one of polycarbonate and polyethylene terephthalate.

In an exemplary embodiment, the second buffering portion may include polyurethane.

In an exemplary embodiment, the display panel may further comprise a double-sided adhesive between the first buffering portion and the second buffering portion which are bonded with each other.

In an exemplary embodiment, the receiving container may include a bottom chassis disposed under the display panel and a top chassis disposed on the display panel and covering a portion of the bottom chassis.

In an exemplary embodiment, the top chassis may include a first side, a second side opposing the first side, a third side connecting the first side and the second side and a fourth side connecting the first side and the second side and opposing the third side.

In an exemplary embodiment, the first side and the third side may have a first width in a plan view.

In an exemplary embodiment, the second side and the fourth side may have a second width different from the first width in the plan view.

In an exemplary embodiment, a sum of the first width and the second width may define a third width.

In an exemplary embodiment, the display apparatus may further include a mold frame disposed under the display panel and supporting the display panel.

In an exemplary embodiment, the display apparatus may further include a supporting member disposed between the display panel and the mold frame.

In an exemplary embodiment, the display apparatus may further include a backlight assembly received in the receiving container and disposed under the display panel.

In an exemplary embodiment, the backlight assembly may include a flexible circuit board, a light source disposed on the flexible circuit board and a light guide plate guiding light from the light source.

In an exemplary embodiment, the light source may include a light emitting diode.

In an exemplary embodiment, the light source may be disposed at an end of the light guide plate.

According to the invention as explained above, a buffering member disposed between the display panel and the top chassis includes a first buffering portion provided with a relatively hard material and a second buffering portion provided with a relatively soft material. Thus, bonding with the top chassis may be substantially easy and the display panel is not pressed excessively by the second buffering portion.

In addition, the second buffering portion may have a division structure so that a gap between the display panel and the buffering member may be minimized. Thus, light-leakage from a gap between the display panel and the buffering member may be effectively prevented.

BRIEF DESCRIPTION OF THE DRAWINGS

The above and other features and advantages of the invention will become more apparent by describing in detailed exemplary embodiments thereof with reference to the accompanying drawings, in which.

DETAILED DESCRIPTION

Hereinafter, the invention will be explained in detail with reference to the accompanying drawings.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 1:
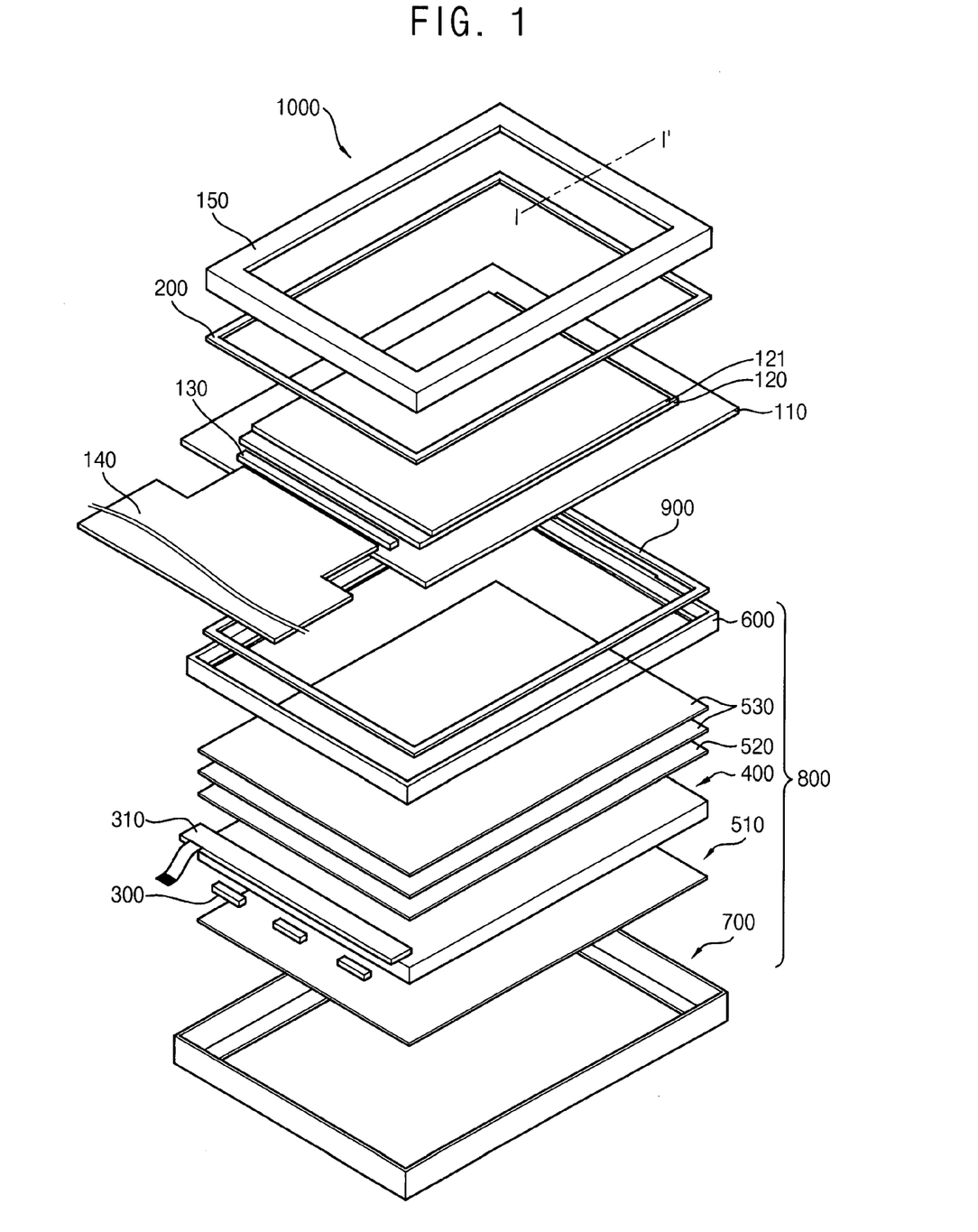
FIG. 1 is an exploded perspective view illustrating an exemplary embodiment of display apparatus according to the invention.
Figure 2:
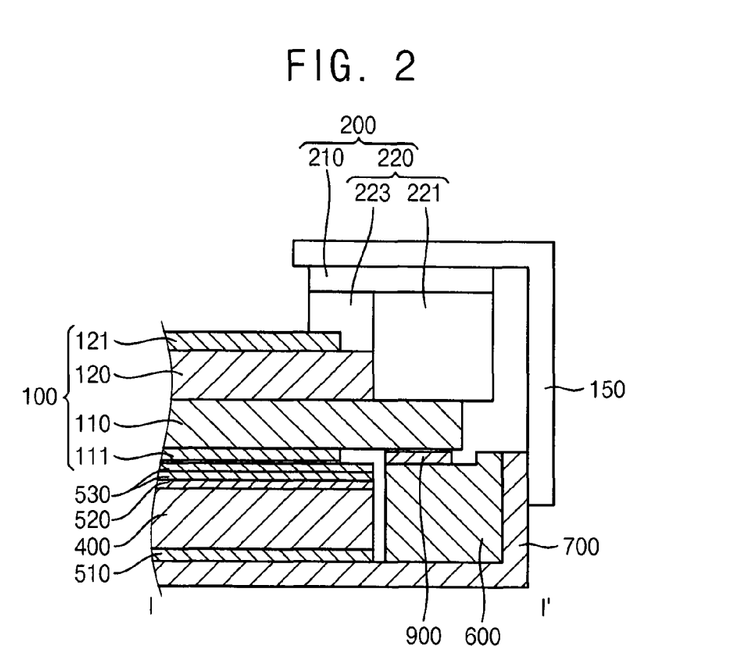
FIG. 2 is a cross-sectional view taken along line I-I' of FIG. 1.

FIG. 1 is an exploded perspective view illustrating an exemplary embodiment of display apparatus according to the invention. FIG. 2 is a cross-sectional view taken along line I-I' of FIG. 1.

Referring to FIGS. 1 and 2, a display apparatus 1000 according to an exemplary embodiment of the invention includes a display panel 100 displaying an image, a main flexible printed circuit 140 electrically connected to the display panel 100, a backlight assembly 800 supplying light to the display panel 100, a top chassis 150 disposed on the display panel 100 and a buffering member 200 disposed between the display panel 100 and the top chassis 150.

The display panel 100 includes a first substrate 110, a second substrate 120 facing the first substrate 110, a liquid crystal layer disposed between the first substrate 110 and the second substrate 120, a first polarizing film 111 disposed on a lower surface of the first substrate 110, a second polarizing film 121 disposed on an upper surface of the second substrate 120 and a buffering member 200. An image is displayed on the display panel 100 using a light from the backlight assembly 800.

The first substrate 110 may include thin film transistors ("TFTs") arranged in a matrix configuration. A source electrode of the TFT is electrically connected to a data line. A gate electrode of the TFT is electrically connected to a gate line. A drain electrode of the TFT is electrically connected to a pixel electrode. The pixel electrode may include a transparent conductive material. In an exemplary embodiment, the pixel electrode may include a transparent conductive material, such as indium tin oxide ("ITO"), indium zinc oxide ("IZO") and etc. In an exemplary embodiment, the pixel electrode may include titanium (Ti) and/or molybdenum titanium (MoTi).

The second substrate 120 faces the first substrate 110. The second substrate 120 may include a color filter realizing a color. The second substrate 120 may include a common electrode. The common electrode may face the pixel electrode. The common electrode may include a transparent conductive material. In an exemplary embodiment, the common electrode may include a transparent conductive material, such as ITO, IZO and etc. In an exemplary embodiment, the common electrode may include titanium (Ti) and/or molybdenum titanium (MoTi).

In an exemplary embodiment, the second substrate 120 may be smaller than the first substrate 110. Accordingly, when the second substrate 120 is disposed on the first substrate 110, the first substrate 110 may be partially exposed. In an exemplary embodiment, the first substrate 110 and the second substrate 120 may have a rectangular shape, for example, and the first substrate 110 may surround the second substrate 120 in a plan view.

When a power voltage is applied to the gate electrode of the TFT to turn on the TFT, an electric field is generated between the pixel electrode and the common electrode. The electric field varies an aligning angle of the liquid crystal molecules of the liquid crystal layer disposed between the first substrate 110 and the second substrate 120. Thus, a light transmittance of the liquid crystal layer is varied in accordance with the variation of the aligning angle of the liquid crystal, so a desired image may be obtained.

The first polarizing film 111 may be disposed on a lower surface of the first substrate 110. The first polarizing film 111 may have a first polarization axis. The first polarizing film 111 may polarize a light in a first direction.

The second polarizing film 121 may be disposed on an upper surface of the second substrate 120. The second polarizing film 121 may have a second polarization axis. In an exemplary embodiment, the second polarizing film 121 may polarize a light in a second direction crossing the first direction. In an exemplary embodiment, the first polarization axis may be crossed with the second polarization axis.

The display panel 100 may further include a driving chip 130. The driving chip 130 may drive the first substrate 110. The driving chip 130 generates a driving signal driving the first substrate 110 in response to a control signal applied from other elements. In the exemplary embodiment, the driving chip 130 may be disposed at an end of the first substrate 110. In an exemplary embodiment, the driving chip 130 may be electrically connected to the first substrate 110 by a chip-on-glass ("COG") process, for example.

The main flexible printed circuit 140 is electrically connected to an end of the first substrate 110 to apply a control signal to the display panel 100. In an exemplary embodiment, the main flexible printed circuit 140 may be electrically connected to the first substrate 110 by a COG process. In the exemplary embodiment, the main flexible printed circuit 140 is connected to the end of the first substrate 110 and bent to face a lower surface of the display panel 100. In an exemplary embodiment, the main flexible printed circuit 140 may include a resin having flexibility.

The backlight assembly 800 is disposed under the display panel 100. The backlight assembly 800 includes a light source unit generating light, a mold frame 600 covering an outside of the light source unit and a bottom chassis 700 receiving the display panel 100 and the mold frame 600.

The light source unit may include a flexible printed circuit board ("FPCB") 310, a light source 300, a light guide plate 400 and a plurality of optical sheets.

The FPCB 310 may provide the light source 300 disposed thereon with driving power. In the exemplary embodiment, the FPCB 310 may be disposed under the first substrate 110 to be adjacent to an end of the display panel 100. In an exemplary embodiment, the FPCB 310 may include a resin having flexibility. In an exemplary embodiment, the FPCB 310 may include a metal line disposed thereon.

The light source 300 disposed on the FPCB 310 to generate light. In the exemplary embodiment, the light source 300 may be mounted on the FPCB 310. In an exemplary embodiment, the light source 300 may include a light emitting diode ("LED") emitting a white light. The number of the light sources 300 may be determined in consideration of size and brightness of the display panel 100. In the exemplary embodiment, the FPCB 310 and the light source 300 may be disposed at an end of the light guide plate 400.

The light guide plate 400 may be disposed under the display panel 100. In an exemplary embodiment, the light guide plate 400 may be provided as a plate shape. The light guide plate 400 may be disposed adjacent to the light source 300 to face a light exit surface of the light source 300. In an exemplary embodiment, a groove (not shown) may be defined in the light guide plate 400. In the exemplary embodiment, the light source 300 is inserted into the groove (not shown) so that a loss of a light may be decreased. The light guide plate 400 guides light emitted from the light source 300 toward the display panel 100.

The light guide plate 400 includes a transparent material to minimize a loss of a light from the light source 300. In an exemplary embodiment, the light guide plate 400 may include a material having superior strength, such as polymethylmethacrylate ("PMMA").

In an alternative exemplary embodiment, in order to reduce a thickness of the light guide plate 400, the light guide plate 400 may include polycarbonate ("PC").

The optical sheets may improve luminance characteristics of a light emitted from the light guide plate 400. The optical sheets may include a reflecting sheet 510, a diffusion sheet 520 and a prism sheet 530.

The reflecting sheet 510 may be disposed under the light guide plate 400. The reflecting sheet 510 reflects light leaked through a lower surface of the light guide plate 400 to the light guide plate 400 so that light efficiency is enhanced.

The diffusion sheet 520 may be disposed on the light guide plate 400. The diffusion sheet 520 may diffuse a light exiting from the light guide plate 400.

The prism sheet 530 may be disposed on the diffusion sheet 520. The prism sheet 530 may condense a light exiting from the light guide plate 400. In an exemplary embodiment, the prism sheet 530 may include a vertical prism sheet condensing a light in a vertical direction and a horizontal prism sheet condensing a light in a horizontal direction, for example.

The mold frame 600 may cover an outside of the light source unit to expose a lower surface of the light source unit. The mold frame 600 may be engaged with the display panel 100 disposed on the light source unit. In an exemplary embodiment, the mold frame 600 may be provided as a frame shape. In an exemplary embodiment, the mold frame 600 may be provided with a macromolecule material. In an exemplary embodiment, the mold frame 600 may include a material having superior strength, such as PMMA. In an exemplary embodiment, a supporting member 900 may be disposed between the first substrate 110 of the display panel 100 and the mold frame 600.

In an alternative exemplary embodiment, in order to reduce a thickness of the mold frame 600, the mold frame 600 may include PC.

The top chassis 150 is disposed on the display panel 100. In an exemplary embodiment, the top chassis 150 may be provided as a frame shape. In an exemplary embodiment, the top chassis 150 may be provided with a metal. The top chassis 150 may cover a portion of an upper surface of the display panel 100. The top chassis 150 may cover a portion of a side surface of the bottom chassis 700.

The buffering member 200 may be disposed between the display panel 100 and the top chassis 150. The buffering member 200 may include a first buffering portion 210 and a second buffering portion 220.

The first buffering portion 210 may contact the top chassis 150. The first buffering portion 210 may be bonded with the top chassis 150. In an exemplary embodiment, the first buffering portion 210 may be bonded with the top chassis 150 by a double-sided adhesive such as a double-sided tape. In an exemplary embodiment, the first buffering portion 210 may include at least one of PC and polyethylene terephthalate, for example. In an exemplary embodiment, the first buffering portion 210 is provided with a relatively hard material so that bonding with the top chassis 150 may be substantially easy.

The second buffering portion 220 may contact the display panel 100. The second buffering portion 220 may be bonded with the first buffering portion 210. In an exemplary embodiment, the second buffering portion 220 may be bonded with the first buffering portion 210 by a double-sided adhesive such as a double-sided tape. In an exemplary embodiment, the second buffering portion 220 may include polyurethane, for example. The second buffering portion 220 is provided with a relatively soft material so that the display panel 100 is not pressed excessively by the second buffering portion 220. In an exemplary embodiment, a gap between the display panel 100 and the buffering member 200 may be minimized.

In an exemplary embodiment, the second buffering portion 220 may have a division structure. The second buffering portion 220 may include a first portion 221 which contacts an upper surface of the first substrate 110, and a second portion 223 disposed adjacent to the first portion 221. The second portion 223 may contact an upper surface of the second substrate 120 and second polarizing film 121. The first portion 221 and the second portion 223 are divided so that the first portion 221 and the second portion 223 may be independently compressible.

In the exemplary embodiment, the second buffering portion 220 of the buffering member 200 is provided with a relatively soft material and includes a first portion 221 and a second portion 223 which are independently compressible so that a gap between the display panel 100 and the buffering member 200 may be minimized. Thus, light-leakage from a gap between the display panel 100 and the buffering member 200 may be effectively prevented.

Figure 3:
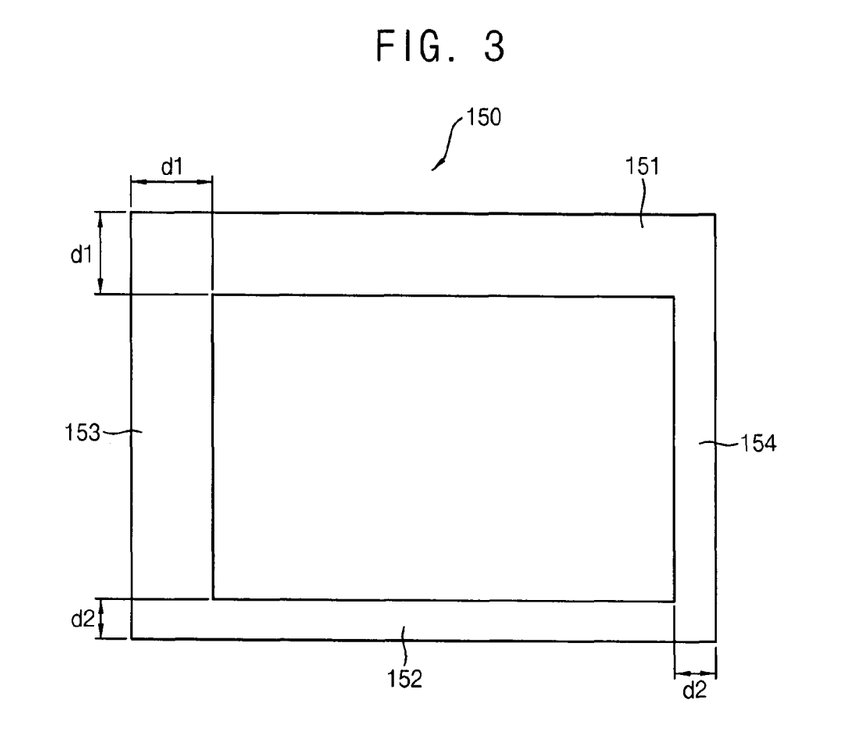
FIG. 3 is a plan view illustrating a top chassis of FIG. 1.

FIG. 3 is a plan view illustrating a top chassis of FIG. 1.

Referring to FIG. 3, the top chassis 150 according to an exemplary embodiment of the invention includes a first side 151, a second side 152 opposing the first side 151, a third side 153 connecting the first side 151 and the second side 152, and a fourth side 154 opposing the third side 153 and connecting the first side 151 and the second side 152. In an exemplary embodiment, the top chassis 150 may be provided as a frame shape, for example.

The first side 151 and the third side 153 have a first width d1 in a plan view. The second side 152 and the fourth side 154 have a second width d2 different from the first width d1 in a plan view. In an exemplary embodiment, the first width d1 may be greater than the second width d2. In an exemplary embodiment, the first width d1 may be about 2.7 millimeters (mm) and the second width d2 may be about 1.2 mm.

Figure 4:
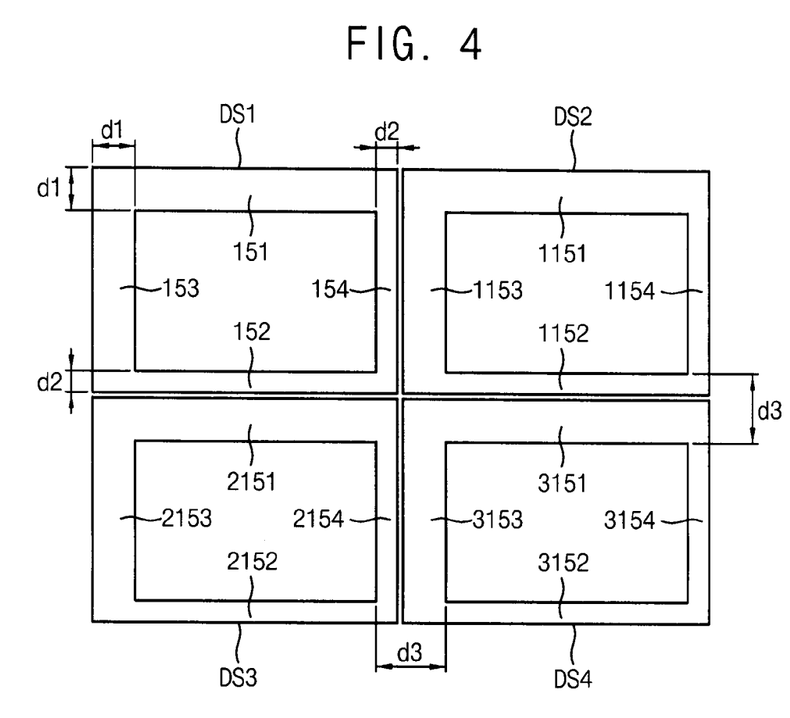
FIG. 4 is a plan view illustrating an exemplary embodiment of a display apparatus according to the invention.

FIG. 4 is a plan view illustrating an exemplary embodiment of a display apparatus according to the invention.

Referring to FIG. 4, an exemplary embodiment of a display apparatus according to the invention includes a first sub-display apparatus DS1, a second sub-display apparatus DS2, a third sub-display apparatus DS3 and a fourth sub-display apparatus DS4. Thus, the display apparatus may be a multi-screen having a plurality of sub-display apparatuses. Each of the first to fourth sub display apparatuses DS1 to DS4 may be substantially the same as the display apparatus of FIGS. 1 and 2.

A second side 152 of the first sub-display apparatus DS1 may be disposed adjacent to a first side 2151 of the third sub-display apparatus DS3. A fourth side 154 of the first sub-display apparatus DS1 may be disposed adjacent to a third side 1153 of the second sub-display apparatus DS2. A fourth side 2154 of the third sub-display apparatus DS3 may be disposed adjacent to a third side 3153 of the fourth sub-display apparatus DS4. A second side 1152 of the second sub-display apparatus DS2 may be disposed adjacent to a first side 3151 of the fourth sub-display apparatus DS4.

The first sides 151, 1151, 2151 and 3151 and the third sides 153, 1153, 2153 and 3153 may have a first width d1 in a plan view. The second sides 152, 1152, 2152 and 3152 and the fourth sides 154, 1154, 2154 and 3154 may have a second width d2 different from the first width d1 in a plan view. In an exemplary embodiment, the first width d1 may be greater than the second width d2. In an exemplary embodiment, the first width d1 may be about 2.7 mm and the second width d2 may be about 1.2 mm.

The first sub-display apparatus DS1 may be disposed adjacent to the third sub-display apparatus DS3. A width of the top chassis between the first sub-display apparatus DS1 and the third sub-display apparatus DS3 may be a third width d3. That is, the third width d3 may be substantially same as the sum of the first width d1 and the second width d2.

Specifically, the second side 152 of the first sub-display apparatus DS1 may have a second width d2 in a plan view. The first side 2151 of the third sub-display apparatus DS3 may have a first width d1 in a plan view. Thus, a sum of width of the top chassis between the first sub-display apparatus DS1 and the third sub-display apparatus DS3 may be a third width d3.

The fourth side 154 of the first sub-display apparatus DS1 may have a second width d2 in a plan view. The third side 1153 of the second sub-display apparatus DS2 may have a first width d1 in a plan view. Thus, a sum of width of the top chassis between the first sub-display apparatus DS1 and the second sub-display apparatus DS2 may be a third width d3.

The fourth side 2154 of the third sub-display apparatus DS3 may have a second width d2 in a plan view. The third side 3153 of the fourth sub-display apparatus DS4 may have a first width d1 in a plan view. Thus, a sum of width of the top chassis between the third sub-display apparatus DS3 and the fourth sub-display apparatus DS4 may be a third width d3.

The second side 1152 of the second sub-display apparatus DS2 may have a second width d2 in a plan view. The first side 3151 of the fourth sub-display apparatus DS4 may have a first width d1 in a plan view. Thus, a sum of width of the top chassis between the second sub-display apparatus DS2 and the fourth sub-display apparatus DS4 may be a third width d3.

In the exemplary embodiment, opposing sides of the first sub-display apparatus DS1, the second sub-display apparatus DS2, the third sub-display apparatus DS3 and the fourth sub-display apparatus DS4 may have different widths from each other. However, a width of the top chassis between adjacent sub-display apparatuses may be same.

Figure 5:
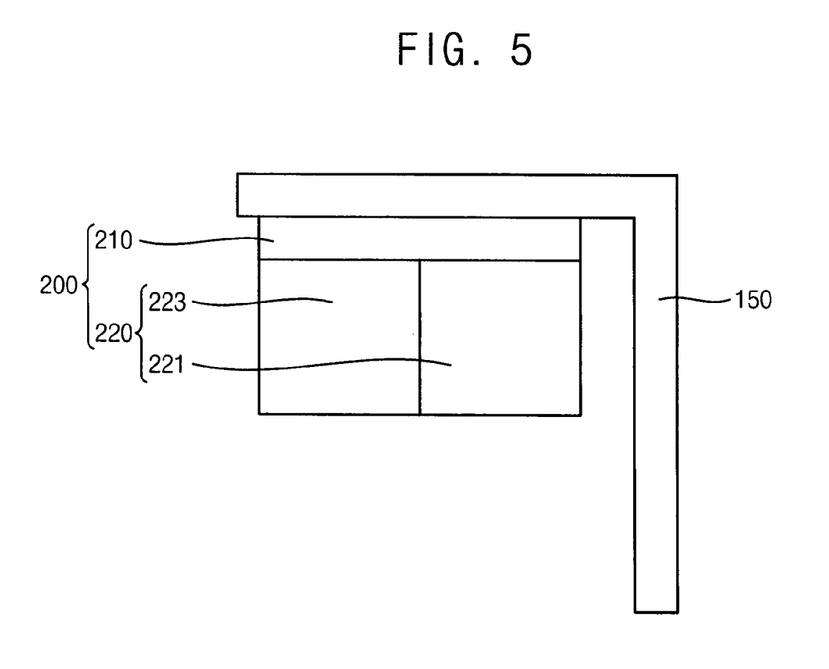
FIG. 5 is a cross-sectional view illustrating an exemplary embodiment of a top chassis and a buffering member according to the invention.

FIG. 5 is a cross-sectional view illustrating an exemplary embodiment of top chassis and buffering member according to the invention.

Referring to FIG. 5, a buffering member 200 according to the invention is bonded with a top chassis 150. The buffering member 200 may include a first buffering portion 210 and a second buffering portion 220.

The first buffering portion 210 may contact the top chassis 150. The first buffering portion 210 may be bonded with the top chassis 150. In an exemplary embodiment, the first buffering portion 210 may be bonded with the top chassis 150 by a double-sided adhesive such as a double-sided tape. In an exemplary embodiment, the first buffering portion 210 may include at least one of PC and polyethylene terephthalate, for example. In an exemplary embodiment, the first buffering portion 210 is provided with a relatively hard material so that bonding with the top chassis 150 may be substantially easy.

The second buffering portion 220 may contact the display panel 100. The second buffering portion 220 may be bonded with the first buffering portion 210. In an exemplary embodiment, the second buffering portion 220 may be bonded with the first buffering portion 210 by a double-sided adhesive such as a double-sided tape. In an exemplary embodiment, the second buffering portion 220 may include polyurethane, for example. The second buffering portion 220 is provided with a relatively soft material so that the display panel 100 is not pressed excessively by the second buffering portion 220. In an exemplary embodiment, a gap between the display panel 100 and the buffering member 200 may be minimized.

In an exemplary embodiment, the second buffering portion 220 may have a two division structure. The second buffering portion 220 may include a first portion 221 which contacts an upper surface of the first substrate 110 (refer to FIG. 2) and a second portion 223 disposed adjacent to the first portion 221. The second portion 223 may contact an upper surface of the second substrate 120 (refer to FIG. 2) and second polarizing film 121 (refer to FIG. 2).

In the exemplary embodiment, the second buffering portion 220 of the buffering member 200 is provided with a relatively soft material and includes a first portion 221 and a second portion 223 independently compressible so that a gap between the display panel 100 and the buffering member 200 may be minimized. Thus, light-leakage from a gap between the display panel 100 and the buffering member 200 may be effectively prevented.

Figure 6:
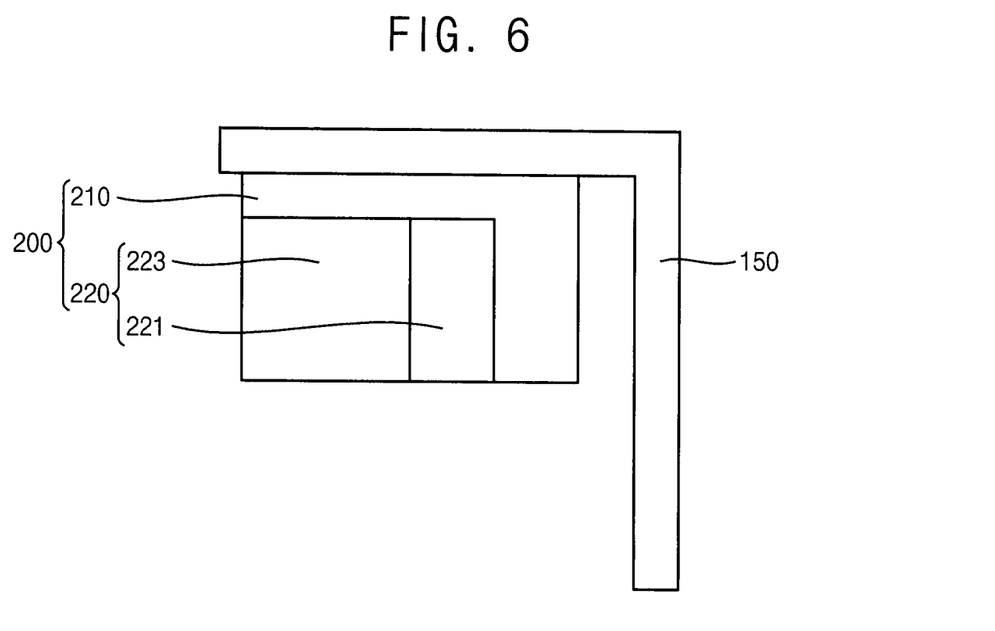
FIG. 6 is a cross-sectional view illustrating an exemplary embodiment of a top chassis and a buffering member according to the invention.

FIG. 6 is a cross-sectional view illustrating an exemplary embodiment of top chassis and buffering member according to the invention.

Referring to FIG. 6, a buffering member 200 according to the invention is bonded with a top chassis 150. The buffering member 200 may include a first buffering portion 210 and a second buffering portion 220.

The first buffering portion 210 may contact the top chassis 150. The first buffering portion 210 may be bonded with the top chassis 150. In an exemplary embodiment, the first buffering portion 210 may be bonded with the top chassis 150 by a double-sided adhesive such as a double-sided tape. In an exemplary embodiment, the first buffering portion 210 may include at least one of PC and polyethylene terephthalate, for example. In an exemplary embodiment, the first buffering portion 210 is provided with a relatively hard material so that bonding with the top chassis 150 may be substantially easy. In the exemplary embodiment, the first buffering portion 210 may be provided as an "L" shape in a cross-sectional view.

The second buffering portion 220 may contact the display panel 100. The second buffering portion 220 may be bonded with the first buffering portion 210. In an exemplary embodiment, the second buffering portion 220 may be bonded with the first buffering portion 210 by a double-sided adhesive such as a double-sided tape. In an exemplary embodiment, the second buffering portion 220 may include polyurethane, for example. The second buffering portion 220 is provided with a relatively soft material so that the display panel 100 is not pressed excessively by the second buffering portion 220. In an exemplary embodiment, a gap between the display panel 100 and the buffering member 200 may be minimized.

The second buffering portion 220 may have a two division structure. The second buffering portion 220 may include a first portion 221 contacting an upper surface of the first substrate 110 (refer to FIG. 2) and a second portion 223 disposed adjacent to the first portion 221. The second portion 223 may contact an upper surface of the second substrate 120 (refer to FIG. 2) and second polarizing film 121 (refer to FIG. 2).

In the exemplary embodiment, the second buffering portion 220 of the buffering member 200 is provided with a relatively soft material and includes a first portion 221 and a second portion 223 independently compressible so that a gap between the display panel 100 and the buffering member 200 may be minimized. Thus, light-leakage from a gap between the display panel 100 and the buffering member 200 may be prevented.

Figure 7:
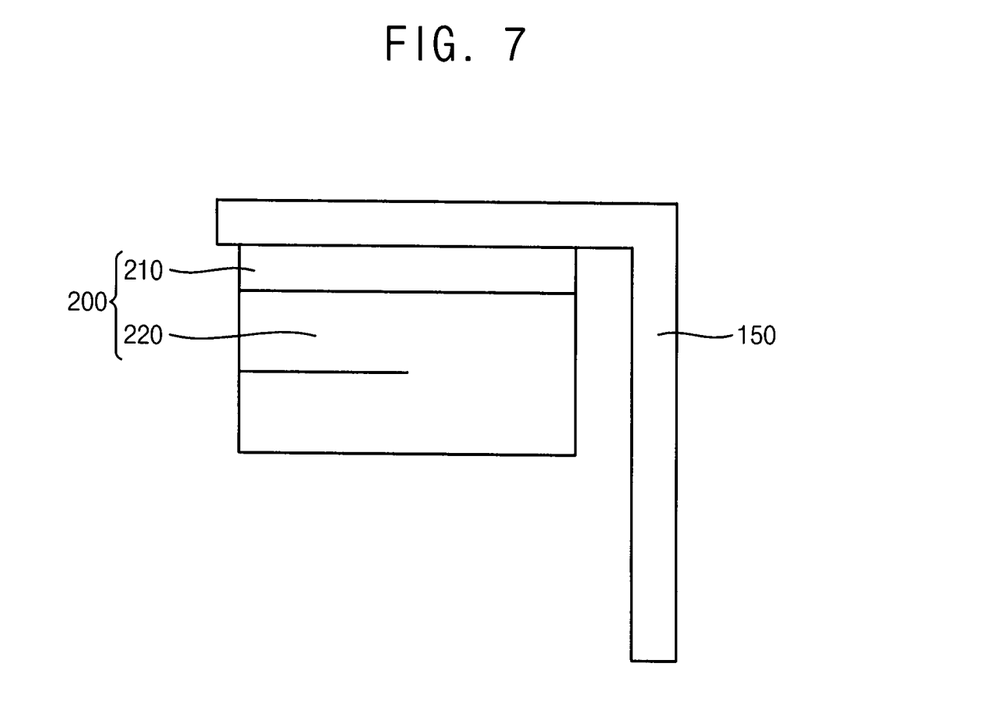
FIG. 7 is a cross-sectional view illustrating an exemplary embodiment of a top chassis and a buffering member according to the invention.

FIG. 7 is a cross-sectional view illustrating an exemplary embodiment of top chassis and buffering member according to the invention.

Referring to FIG. 7, a buffering member 200 according to the invention is bonded with a top chassis 150. The buffering member 200 may include a first buffering portion 210 and a second buffering portion 220.

The first buffering portion 210 may contact the top chassis 150. The first buffering portion 210 may be bonded with the top chassis 150. In an exemplary embodiment, the first buffering portion 210 may be bonded with the top chassis 150 by a double-sided adhesive such as a double-sided tape. In an exemplary embodiment, the first buffering portion 210 may include at least one of PC and polyethylene terephthalate, for example. The first buffering portion 210 is provided with a relatively hard material so that bonding with the top chassis 150 may be substantially easy.

The second buffering portion 220 may contact the display panel 100. The second buffering portion 220 may be bonded with the first buffering portion 210. In an exemplary embodiment, the second buffering portion 220 may be bonded with the first buffering portion 210 by a double-sided adhesive such as a double-sided tape. In an exemplary embodiment, the second buffering portion 220 may include polyurethane, for example. The second buffering portion 220 is provided with a relatively soft material so that the display panel 100 is not pressed excessively by the second buffering portion 220. In an exemplary embodiment, a gap between the display panel 100 and the buffering member 200 may be minimized.

The second buffering portion 220 may have a two division structure. The second buffering portion 220 may be partially divided in a horizontal direction. An un-divided portion of the second buffering portion 220 may contact an upper surface of the first substrate 110 (refer to FIG. 2). A divided portion of the second buffering portion 220 may contact an upper surface of the second substrate 120 (refer to FIG. 2) and second polarizing film 121 (refer to FIG. 2).

In the exemplary embodiment, the second buffering portion 220 of the buffering member 200 is provided with a relatively soft material so that a gap between the display panel 100 and the buffering member 200 may be minimized. Thus, light-leakage from a gap between the display panel 100 and the buffering member 200 may be prevented.

Figure 8:
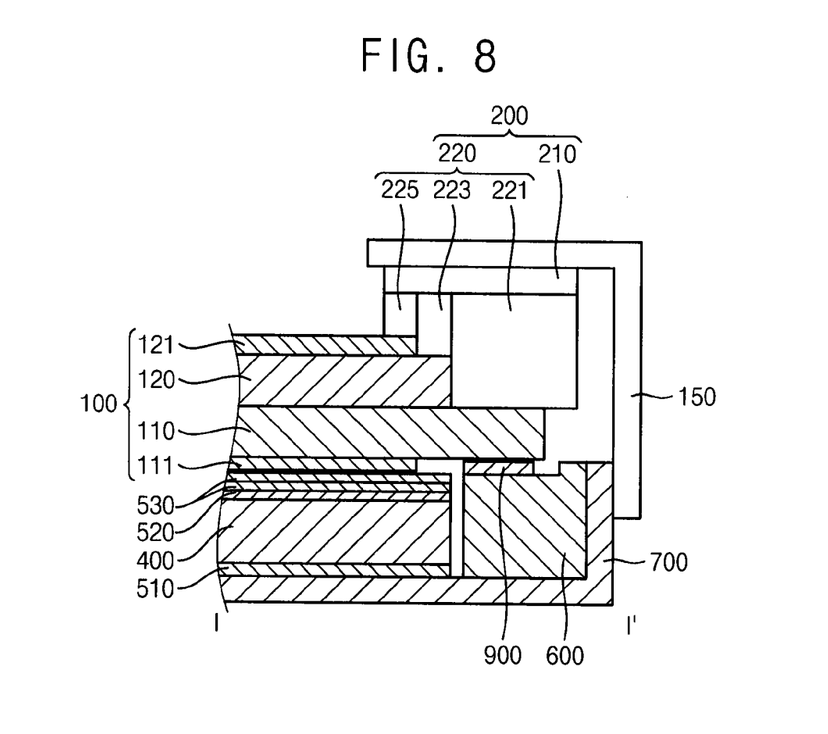
FIG. 8 is a cross-sectional view illustrating an exemplary embodiment of a display apparatus according to the invention.

FIG. 8 is a cross-sectional view illustrating an exemplary embodiment of display apparatus according to the invention.

Referring to FIGS. 1 and 8, a display apparatus 1000 according to an exemplary embodiment of the invention includes a display panel 100 displaying an image, a main flexible printed circuit 140 electrically connected to the display panel 100, a backlight assembly 800 supplying light to the display panel 100, a top chassis 150 disposed on the display panel 100 and a buffering member 200 disposed between the display panel 100 and the top chassis 150.

The display panel 100 includes a first substrate 110, a second substrate 120 facing the first substrate 110, a liquid crystal layer disposed between the first substrate 110 and the second substrate 120, a first polarizing film 111 disposed on a lower surface of the first substrate 110, a second polarizing film 121 disposed on an upper surface of the second substrate 120. An image is displayed on the display panel 100 using a light from the backlight assembly 800.

The first substrate 110 may include TFTs arranged in a matrix configuration. A source electrode of the TFT is electrically connected to a data line. A gate electrode of the TFT is electrically connected to a gate line. A drain electrode of the TFT is electrically connected to a pixel electrode. The pixel electrode may include a transparent conductive material. In an exemplary embodiment, the pixel electrode may include a transparent conductive material, such as ITO, IZO and etc. In an exemplary embodiment, the pixel electrode may include titanium (Ti) and/or molybdenum titanium (MoTi).

The second substrate 120 faces the first substrate 110. The second substrate 120 may include a color filter realizing a color. The second substrate 120 may include a common electrode. The common electrode may face the pixel electrode. The common electrode may include a transparent conductive material. In an exemplary embodiment, the common electrode may include a transparent conductive material, such as ITO, IZO and etc. In an exemplary embodiment, the common electrode may include titanium (Ti) and/or molybdenum titanium (MoTi).

The second substrate 120 may be smaller than the first substrate 110. Accordingly, when the second substrate 120 is disposed on the first substrate 110, the first substrate 110 may be partially exposed. In an exemplary embodiment, the first substrate 110 and the second substrate 120 may have a rectangular shape, for example, and the first substrate 110 may surround the second substrate 120 in a plan view.

When a power voltage is applied to the gate electrode of the TFT that in turn turns on the TFT, the electric field is generated between the pixel electrode and the common electrode. The electric field varies an aligning angle of the liquid crystal molecules of the liquid crystal layer disposed between the first substrate 110 and the second substrate 120. Thus, a light transmittance of the liquid crystal layer is varied in accordance with the variation of the aligning angle of the liquid crystal, so a desired image may be obtained.

The first polarizing film 111 may be disposed on a lower surface of the first substrate 110. The first polarizing film 111 may have a first polarization axis. The first polarizing film 111 may polarize a light in a first direction.

The second polarizing film 121 may be disposed on an upper surface of the second substrate 120. The second polarizing film 121 may have a second polarization axis. The second polarizing film 121 may polarize a light in a second direction crossing the first direction. In an exemplary embodiment, the first polarization axis may be crossed with the second polarization axis.

The display panel 100 may further include a driving chip 130. The driving chip 130 may drive the first substrate 110. The driving chip 130 generates a driving signal driving the first substrate 110 in response to a control signal applied from other elements. In the exemplary embodiment, the driving chip 130 may be disposed at an end of the first substrate 110. In an exemplary embodiment, the driving chip 130 may be electrically connected to the first substrate 110 by a COG process.

The main flexible printed circuit 140 is electrically connected to an end of the first substrate 110 to apply a control signal to the display panel 100. In an exemplary embodiment, the main flexible printed circuit 140 may be electrically connected to the first substrate 110 by a COG process. In the exemplary embodiment, the main flexible printed circuit 140 is connected to the end of the first substrate 110 and bent to a lower surface of the display panel 100. In an exemplary embodiment, the main flexible printed circuit 140 may include a resin having flexibility.

The backlight assembly 800 is disposed under the display panel 100. The backlight assembly 800 includes a light source unit generating light, a mold frame 600 covering an outside of the light source unit and a bottom chassis 700 receiving the display panel 100 and the mold frame 600.

The light source unit may include an FPCB 310, a light source 300, a light guide plate 400 and a plurality of optical sheets.

The FPCB 310 may provide the light source 300 disposed thereon with driving power. In the exemplary embodiment, the FPCB 310 may be disposed under the first substrate 110 to be adjacent to an end of the display panel 100. In an exemplary embodiment, the FPCB 310 may include a resin having flexibility. In an exemplary embodiment, the FPCB 310 may include a metal line disposed thereon.

The light source 300 disposed on the FPCB 310 to generate light. In the exemplary embodiment, the light source 300 may be mounted on the FPCB 310. In an exemplary embodiment, the light source 300 may include an LED emitting a white light. The number of the light sources 300 may be determined in consideration of size and brightness of the display panel 100. In the exemplary embodiment, the FPCB 310 and the light source 300 may be disposed at an end of the light guide plate 400.

The light guide plate 400 may be disposed under the display panel 100. In an exemplary embodiment, the light guide plate 400 may be provided as a plate shape, for example. The light guide plate 400 may be disposed adjacent to the light source 300 to face a light exit surface of the light source 300. In an exemplary embodiment, a groove (not shown) may be defined in the light guide plate 400. In the exemplary embodiment, the light source 300 is inserted into the groove (not shown) so that a loss of a light may be decreased. The light guide plate 400 guides light emitted from the light source 300 toward the display panel 100.

The light guide plate 400 includes a transparent material to minimize a loss of a light from the light source 300. In an exemplary embodiment, the light guide plate 400 may include a material having superior strength, such as PMMA.

In an alternative exemplary embodiment, in order to reduce a thickness of the light guide plate 400, the light guide plate 400 may include PC.

The optical sheets may improve luminance characteristics of a light emitted from the light guide plate 400. The optical sheets may include a reflecting sheet 510, a diffusion sheet 520 and a prism sheet 530.

The reflecting sheet 510 may be disposed under the light guide plate 400. The reflecting sheet 510 reflects light leaked through a lower surface of the light guide plate 400 back to the light guide plate 400 so that light efficiency is enhanced.

The diffusion sheet 520 may be disposed on the light guide plate 400. The diffusion sheet 520 may diffuse a light exiting from the light guide plate 400.

The prism sheet 530 may be disposed on the diffusion sheet 520. The prism sheet 530 may condense a light exiting from the light guide plate 400. In an exemplary embodiment, the prism sheet 530 may include a vertical prism sheet condensing a light in a vertical direction and a horizontal prism sheet condensing a light in a horizontal direction.

The mold frame 600 may cover an outside of the light source unit to expose a lower surface of the light source unit. The mold frame 600 may be engaged with the display panel 100 disposed on the light source unit. In an exemplary embodiment, the mold frame 600 may be provided as a frame shape, for example. In an exemplary embodiment, the mold frame 600 may be provided with a macromolecule material. In an exemplary embodiment, the mold frame 600 may include a material having superior strength, such as PMMA.

In an alternative exemplary embodiment, in order to reduce a thickness of the mold frame 600, the mold frame 600 may include PC.

The top chassis 150 is disposed on the display panel 100. In an exemplary embodiment, the top chassis 150 may be provided as a frame shape, for example. In an exemplary embodiment, the top chassis 150 may be provided with a metal. The top chassis 150 may cover a portion of an upper surface of the display panel 100. The top chassis 150 may cover a portion of a side surface of the bottom chassis 700.

The buffering member 200 may be disposed between the display panel 100 and the top chassis 150. The buffering member 200 may include a first buffering portion 210 and a second buffering portion 220.

The first buffering portion 210 may contact the top chassis 150. The first buffering portion 210 may be bonded with the top chassis 150. In an exemplary embodiment, the first buffering portion 210 may be bonded with the top chassis 150 by a double-sided adhesive such as a double-sided tape. In an exemplary embodiment, the first buffering portion 210 may include at least one of PC and polyethylene terephthalate, for example. The first buffering portion 210 is provided with a relatively hard material so that bonding with the top chassis 150 may be substantially easy.

The second buffering portion 220 may contact the display panel 100. The second buffering portion 220 may be bonded with the first buffering portion 210. In an exemplary embodiment, the second buffering portion 220 may be bonded with the first buffering portion 210 by a double-sided adhesive such as a double-sided tape. In an exemplary embodiment, the second buffering portion 220 may include polyurethane, for example. The second buffering portion 220 is provided with a relatively soft material so that the display panel 100 is not pressed excessively by the second buffering portion 220. In an exemplary embodiment, a gap between the display panel 100 and the buffering member 200 may be minimized.

The second buffering portion 220 may have a three division structure. The second buffering portion 220 may include a first portion 221 which contacts an upper surface of the first substrate 110, a second portion 223 disposed adjacent to the first portion 221 and a third portion 225. The second portion 223 may contact an upper surface of the second substrate 120. The third portion 225 may contact the second polarizing film 121. The first portion 221, the second portion 223 and the third portion 225 are divided so that the first portion 221, the second portion 223 and the third portion 225 may be independently compressible.

In the exemplary embodiment, the second buffering portion 220 of the buffering member 200 is provided with a relatively soft material and includes a first portion 221, the second portion 223 and the third portion 225 independently compressible so that a gap between the display panel 100 and the buffering member 200 may be minimized. Thus, light-leakage from a gap between the display panel 100 and the buffering member 200 may be prevented.

Figure 9:
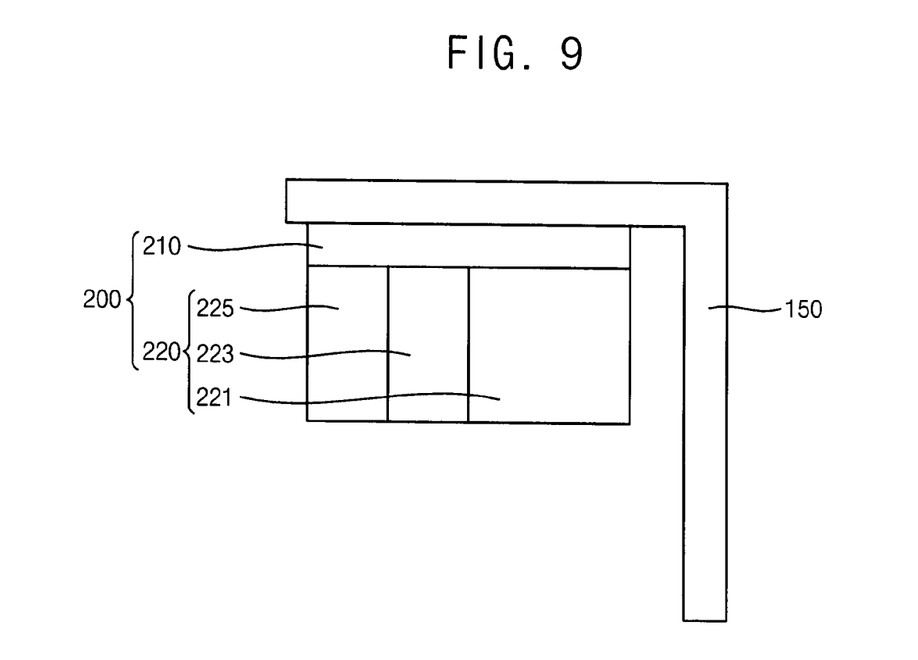
FIG. 9 is a cross-sectional view illustrating an exemplary embodiment of a top chassis and a buffering member according to the invention.

FIG. 9 is a cross-sectional view illustrating an exemplary embodiment of top chassis and buffering member according to the invention.

Referring to FIG. 9, a buffering member 200 according to the invention is bonded with a top chassis 150. The buffering member 200 may include a first buffering portion 210 and a second buffering portion 220.

The first buffering portion 210 may contact the top chassis 150. The first buffering portion 210 may be bonded with the top chassis 150. In an exemplary embodiment, the first buffering portion 210 may be bonded with the top chassis 150 by a double-sided adhesive such as a double-sided tape. In an exemplary embodiment, the first buffering portion 210 may include at least one of PC and polyethylene terephthalate, for example. The first buffering portion 210 is provided with a relatively hard material so that bonding with the top chassis 150 may be substantially easy.

The second buffering portion 220 may contact the display panel 100. The second buffering portion 220 may be bonded with the first buffering portion 210. In an exemplary embodiment, the second buffering portion 220 may be bonded with the first buffering portion 210 by a double-sided adhesive such as a double-sided tape. In an exemplary embodiment, the second buffering portion 220 may include polyurethane, for example. The second buffering portion 220 is provided with a relatively soft material so that the display panel 100 is not pressed excessively by the second buffering portion 220. In an exemplary embodiment, a gap between the display panel 100 and the buffering member 200 may be minimized.

The second buffering portion 220 may have a three division structure. The second buffering portion 220 may include a first portion 221 which contacts an upper surface of the first substrate 110 (refer to FIG. 8), a second portion 223 disposed adjacent to the first portion 221 and a third portion 225. The second portion 223 may contact an upper surface of the second substrate 120 (refer to FIG. 8). The third portion 225 may contact the second polarizing film 121 (refer to FIG. 8).

In the exemplary embodiment, the second buffering portion 220 of the buffering member 200 is provided with a relatively soft material and includes a first portion 221, the second portion 223 and the third portion 225 independently compressible so that a gap between the display panel 100 and the buffering member 200 may be minimized. Thus, light-leakage from a gap between the display panel 100 and the buffering member 200 may be prevented.

Figure 10:
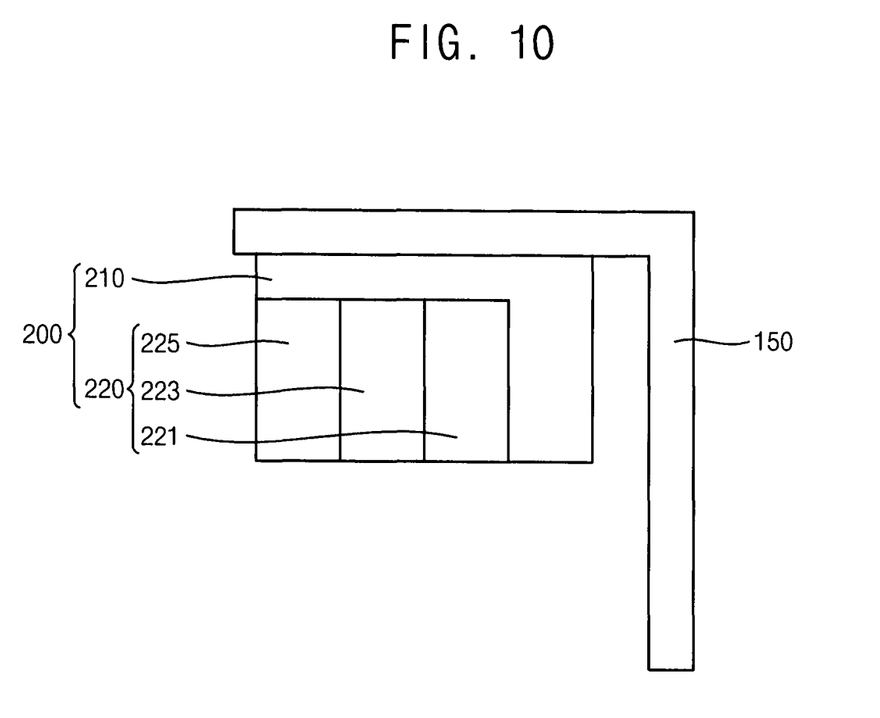
FIG. 10 is a cross-sectional view illustrating an exemplary embodiment of a top chassis and a buffering member according to the invention.

FIG. 10 is a cross-sectional view illustrating an exemplary embodiment of top chassis and buffering member according to the invention.

Referring to FIG. 10, a buffering member 200 according to the invention is bonded with a top chassis 150. The buffering member 200 may include a first buffering portion 210 and a second buffering portion 220.

The first buffering portion 210 may contact the top chassis 150. The first buffering portion 210 may be bonded with the top chassis 150. In an exemplary embodiment, the first buffering portion 210 may be bonded with the top chassis 150 by a double-sided adhesive such as a double-sided tape. In an exemplary embodiment, the first buffering portion 210 may include at least one of PC and polyethylene terephthalate, for example. The first buffering portion 210 is provided with a relatively hard material so that bonding with the top chassis 150 may be substantially easy. In the exemplary embodiment, the first buffering portion 210 may be provided as an "L" shape in a cross-sectional view.

The second buffering portion 220 may contact the display panel 100. The second buffering portion 220 may be bonded with the first buffering portion 210. In an exemplary embodiment, the second buffering portion 220 may be bonded with the first buffering portion 210 by a double-sided adhesive such as a double-sided tape. In an exemplary embodiment, the second buffering portion 220 may include polyurethane, for example. The second buffering portion 220 is provided with a relatively soft material so that the display panel 100 is not pressed excessively by the second buffering portion 220. In an exemplary embodiment, a gap between the display panel 100 and the buffering member 200 may be minimized.

The second buffering portion 220 may have a three division structure. The second buffering portion 220 may include a first portion 221 which contacts an upper surface of the first substrate 110 (refer to FIG. 8), a second portion 223 disposed adjacent to the first portion 221 and a third portion 225. The second portion 223 may contact an upper surface of the second substrate 120 (refer to FIG. 8). The third portion 225 may contact the second polarizing film 121 (refer to FIG. 8).

In the exemplary embodiment, the second buffering portion 220 of the buffering member 200 is provided with a relatively soft material and includes a first portion 221, the second portion 223 and the third portion 225 independently compressible so that a gap between the display panel 100 and the buffering member 200 may be minimized. Thus, light-leakage from a gap between the display panel 100 and the buffering member 200 may be prevented.

According to the invention as explained above, a buffering member disposed between the display panel and the top chassis includes a first buffering portion provided with a relatively hard material and a second buffering portion provided with a relatively soft material. Thus, bonding with the top chassis may be substantially easy and the display panel is not pressed excessively by the second buffering portion.

In addition, the second buffering portion may have a division structure so that a gap between the display panel and the buffering member may be minimized. Thus, light-leakage from a gap between the display panel and the buffering member may be prevented.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A display apparatus comprising:
   a display panel configured to display an image;
   a receiving container configured to receive the display panel;
   a buffering member which is disposed between the display panel and the receiving container, and includes:
   a first buffering portion which contacts the receiving container; and
   a second buffering portion which contacts the display panel and the first buffering portion, and includes a first portion and a second portion which are independently compressible.

2. The display apparatus of claim 1, wherein the display panel comprises:
   a first substrate;
   a second substrate which faces the first substrate and is smaller than the first substrate in a plan view; and
   a polarizing film which is disposed on the second substrate and smaller than the second substrate in the plan view.

3. The display apparatus of claim 2, wherein
   the first portion of the second buffering portion contacts the first substrate, and
   the second portion of the second buffering portion contacts the polarizing film.

4. The display apparatus of claim 2, wherein the second buffering portion further comprises a third portion which is independently compressible from the first and second portions.

5. The display apparatus of claim 4, wherein
   the first portion of the second buffering portion contacts the first substrate, and
   the second portion of the second buffering portion contacts the second substrate, and
   the third portion of the second buffering portion contacts the polarizing film.

6. The display apparatus of claim 1, wherein the first buffering portion has an "L" shape in a cross-sectional view.

7. The display apparatus of claim 1, wherein the first buffering portion comprises at least one of polycarbonate and polyethylene terephthalate.

8. The display apparatus of claim 1, wherein the second buffering portion comprises polyurethane.

9. The display apparatus of claim 1, further comprising a double-sided adhesive which is between the first buffering portion and the second buffering portion and bonds the first buffering portion to the second buffering portion.

10. The display apparatus of claim 1, wherein the receiving container comprises:

a bottom chassis disposed under the display panel; and a top chassis disposed on the display panel and covering a portion of the bottom chassis.

11. The display apparatus of claim 10, wherein the top chassis comprises:

a first side;

a second side opposing the first side;

a third side connecting the first side and the second side; and a fourth side connecting the first side and the second side and opposing the third side.

12. The display apparatus of claim 11, wherein the first side and the third side have a first width in a plan view.

13. The display apparatus of claim 12, wherein the second side and the fourth side have a second width different from the first width in the plan view.

14. The display apparatus of claim 13, wherein a sum of the first width and the second width defines a third width.

15. The display apparatus of claim 14, further comprising a mold frame disposed under the display panel and supporting the display panel.

16. The display apparatus of claim 15, further comprising a supporting member disposed between the display panel and the mold frame.

17. The display apparatus of claim 1, further comprising a backlight assembly received in the receiving container and disposed under the display panel.

18. The display apparatus of claim 17, wherein the backlight assembly comprises:

a flexible circuit board;

a light source disposed on the flexible circuit board; and a light guide plate guiding light from the light source.

19. The display apparatus of claim 18, wherein the light source comprises a light emitting diode.

20. The display apparatus of claim 18, wherein the light source is disposed at an end of the light guide plate.

21. The display apparatus of claim 1, wherein the first portion and a second portion are interposed between the first buffering portion contacting the receiving container and a portion of the display panel contacting the second buffering portion.

* * * * *